Patented July 28, 1925.

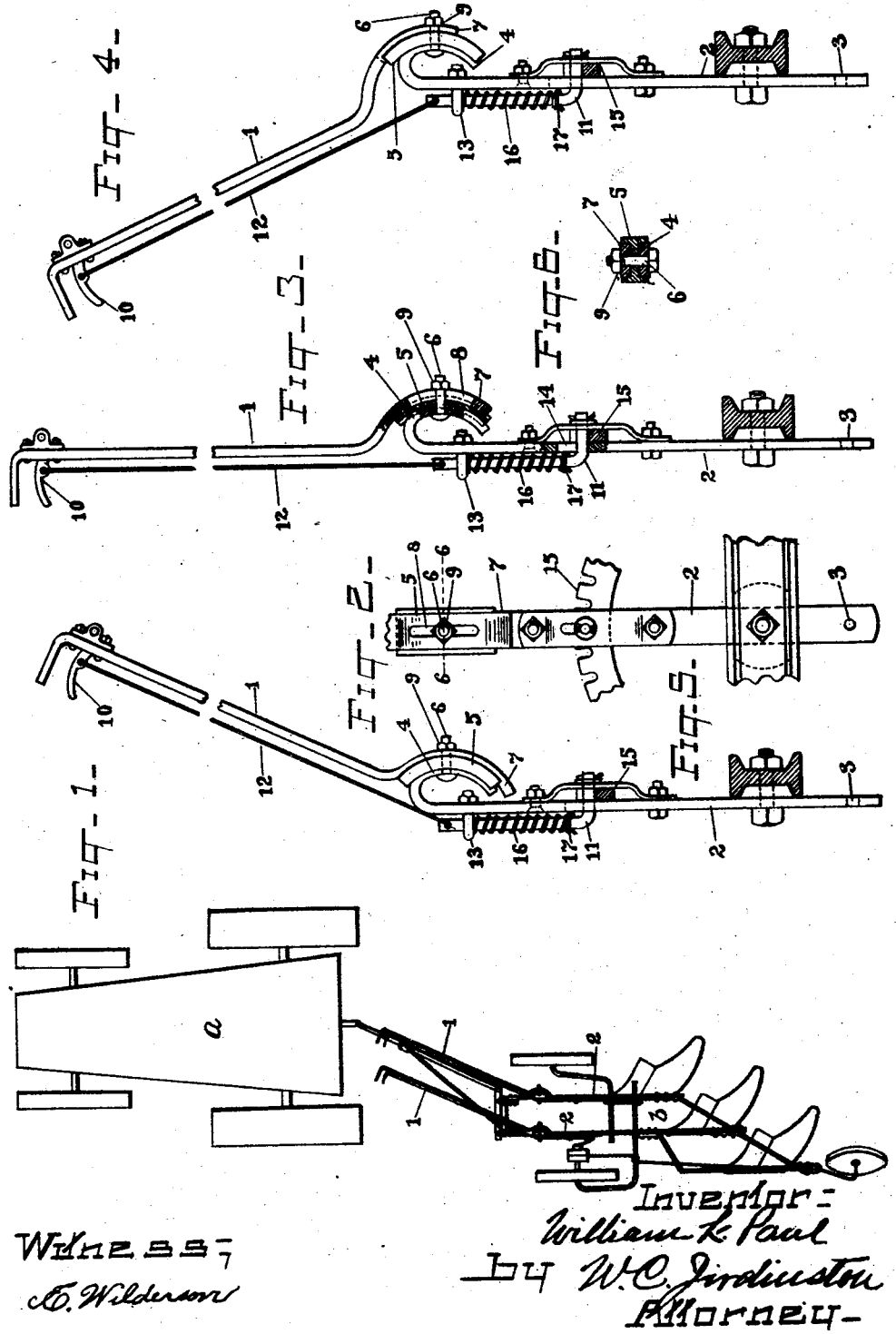

1,547,819

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

LEVER.

Application filed November 18, 1919. Serial No. 338,878.

*To all whom it may concern:*

Be it known that I, WILLIAM L. PAUL, a citizen of the United States, residing at Berkeley, in the county of Alameda and State of California, have invented certain new and useful Improvements in Levers, of which the following is a specification, reference being had therein to the accompanying drawing.

My invention relates to a lever mechanism adapted more particularly for use on tractor drawn agricultural implements, and the object of my invention is to provide a device of this character which is adjustable laterally to various positions convenient to an operator from his position on the tractor.

Referring to the drawings in which similar numerals indicate identical parts,

Figure 1 is a diagrammatic illustration of a tractor drawn plow embodying my invention.

Figure 2 is a view of the lever detached and adjusted to the position in which it is utilized when the tractor is offset to the right of the plow.

Figure 3 is a view in part section showing the lever as it is used when the plow and tractor are in direct line.

Figure 4 is a similar view to Figure 1 but illustrating the position of the lever when the tractor is offset to the left of the plow.

Figure 5 is an enlarged detail side elevation of part of the lever, and

Figure 6 is an enlarged section on the line 6—6 of Figure 5.

The lever consists of parts 1 and 2, which are rigid together and normally in alinement except when part 1 is adjusted as hereinafter described. Part 2 is to be pivotally mounted at its end 3 on any machine where the lever is to be used; the opposite end of the part 2 is bent over and formed into a curved part 4, a construction which I prefer, instead of making the curved part 4 separate and securing it to the part 2. The curved part 4 is fitted snugly within a channel of a portion of an I beam 5 which is concentric with the curved part 4 and to which it is secured by a bolt 6. An end 7 of the part 1 of the lever is also formed concentric with the part 4 and the I beam 5 and is movably secured in the opposite channel of the I beam by the bolt 6 which extends through a longitudinal slot 8 in the end 7 of the part 1. A nut 9 holds the curved parts firmly together.

A latch 10, on the free end of the part 1, is connected to a dog 11 by a rod 12; the dog 11 extends through an eye 13 and is bent to project through a slot 14 in the part 2 of the lever so as to engage with the usual type of notched sector 15, and retained in such engagement by the force of a coiled spring 16 which is mounted on the dog 11 and compressed between the eye 13 and a washer 17 on the dog.

In Figure 3 the lever is shown as used when the tractor *a* and plow *b* are traveling in a direct line, it is frequently necessary however that the tractor and plow be offset from each other particularly in orchards where it is desired to break the soil closer to the trees than it would be possible to do, if the tractor and plow were in direct line, without damage to the trees by the tractor, now if the lever should be as shown in Figure 3, when the tractor *a* and plow *b* are offset, it is at once apparent that the levers would be inconveniently placed for the operator on the tractor *a*, therefore to make the levers as accessible to the operator as they are when the tractor and plow are in a direct line, the tractor and plow having been offset as in Figure 1, I loosen the nut 9 and rock the part 1 of the lever transversely to the plane of movement of the part 2 to the position shown in Figure 2, the part 1 moving freely, by reason of the slot 8 therein, and guided, and prevented from pivotal movement on the bolt 6, by the sides of the channel in which the curved end 7 is confined, and by tightening the nut 9 the parts 1 and 2 are again rigidly together and as shown in Figures 1 and 2. It is apparent that the lever can be adjusted in the same way as shown in Figure 3, to accommodate an operator when the tractor and plow are offset in the opposite direction from that shown in Figure 1. It will also be apparent that the lateral adjustment of the part 1 does not interfere with a proper functioning of the dog 11 with the segment 15, and as the curved parts 4 and 7 are concentric with the connecting point of the rod 12 with the dog 11, consequently there is little lost motion of the rod 12 and latch 10 when the part 1 is adjusted to a position at an angle to the part 2.

I have shown the lever as used on a plow but it is believed that a lever so constructed can be utilized in other situations, on other machines, where machine construction and operation may make it necessary. In this instance both of the levers shown in Figure 1 are alike and are operated in a vertical plane for the purpose of raising and lowering the plow, but it is obvious that either of them can be mounted to operate in a different plane if it should be desirable.

What I claim is—

1. A pivoted lever formed of a plurality of parts secured together and normally in alinement and rockable on its pivot as an entirety, one of said parts being pivotally mounted adjacent one end on a support and having its opposite end curved, the second part of said lever having an end curved concentrically with the curve of the other part and secured thereon and movable to adjust the second part at an angle to the pivotal movement of the lever, and means to secure said parts rigidly together after said adjustment.

2. A lever formed of a plurality of parts normally in alinement and secured together to be operated as an entirety, one of said parts pivotally mounted adjacent one end on a support and having a curved portion at its opposite end, the other part of said lever having a curved portion concentric with the curve of the pivoted part and movable thereon to adjust said other part at an angle to the plane of the pivoted part, a guide secured between said curved parts, and means to secure said curved parts rigidly together.

3. A lever formed of a plurality of parts normally in alinement and secured together to be operated as an entirety, one of said parts pivotally mounted adjacent one end on a support and having its opposite end curved, a guideway concentric with said curved end and rigidly secured thereto, the second part of said lever having an end curved concentric to said guideway and movable therein to adjust said second part at an angle to the pivotal movement of the lever, and means to secure said second part in various positions of adjustment.

4. A lever formed of two parts secured together and normally in alinement and operable as an entirety, one of said parts being pivotally mounted adjacent one end on a support and having its opposite end curved, a notched sector secured on the support, a dog mounted on said part and cooperating with the sector to hold the lever in varying positions, the second part of said lever having an end curved to register with the curve of the first part and movably secured thereon for adjustment of said second part angularly transversely to the pivotal movement of the lever, and means on said second part connected with the dog and operable to control the actuation thereof, the arc of curvature of the connection of the two parts being concentric with the connection of said means with the dog.

WILLIAM L. PAUL.